March 5, 1929.  E. A. DE FOREST  1,704,179
GREASE GUN
Filed Aug. 21, 1925  3 Sheets-Sheet 3
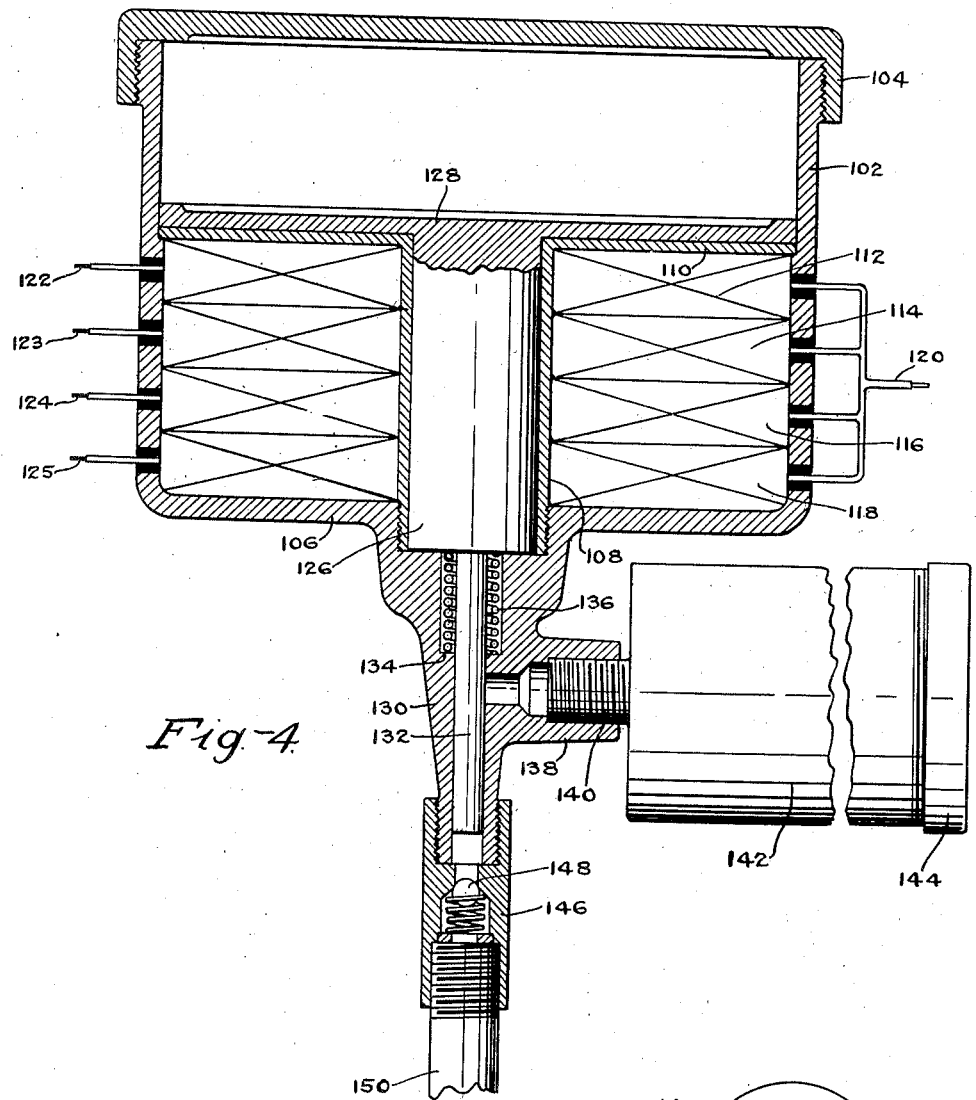
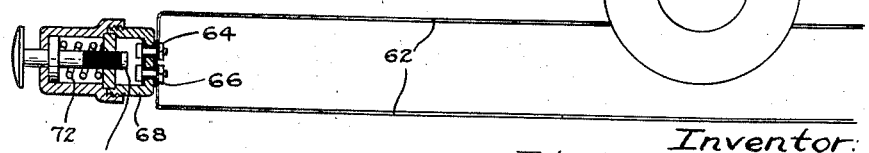
Inventor:
Edgar A. DeForest.
By Whiteley and Ruckman
Attorneys Patented Mar. 5, 1929.

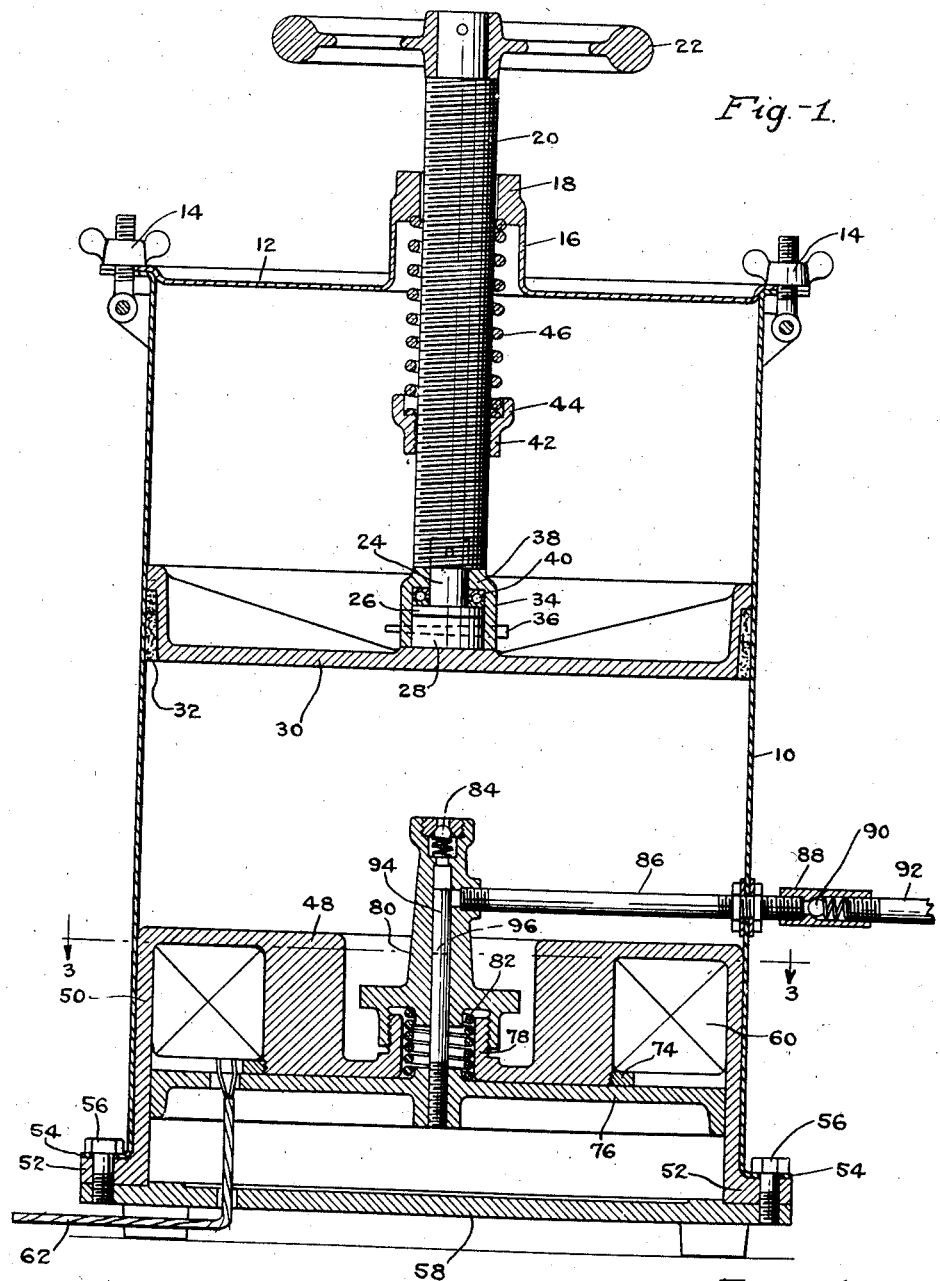

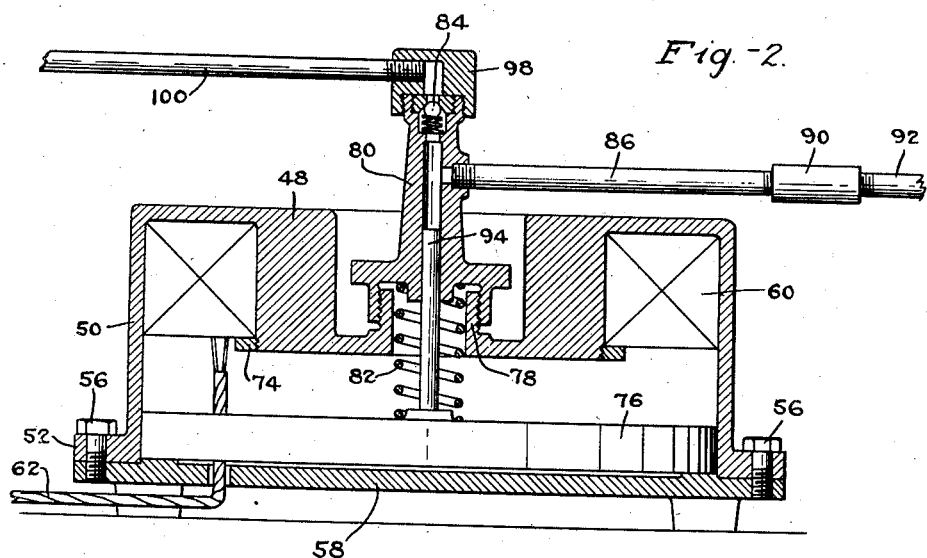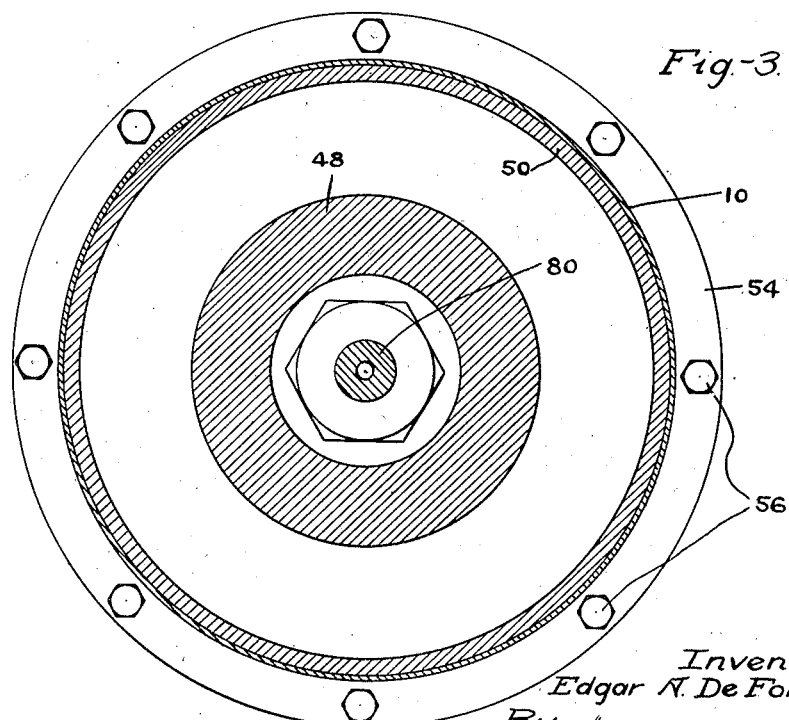

1,704,179

UNITED STATES PATENT OFFICE.

EDGAR A. DE FOREST, OF MINNEAPOLIS, MINNESOTA, ASSIGNOR TO GRAY COMPANY, INC., OF MINNEAPOLIS, MINNESOTA, A CORPORATION OF SOUTH DAKOTA.

GREASE GUN.

Application filed August 21, 1925. Serial No. 51,589.

My invention relates to grease guns. An object is to provide a device of this character by means of which grease for lubricating purposes may be effectively delivered. While intended more particularly for use in lubricating parts of motor vehicles, it will be obvious that there are many other places where my device may be used to advantage for obtaining efficient and timely lubrication of moving parts.

The full objects and advantages of my invention will appear in connection with the detailed description thereof, and the novel features embodied in my inventive idea will be particularly pointed out in the claims.

In the accompanying drawings which illustrate some of the forms in which my invention may be embodied, Fig. 1 is a view of one form of the device in vertical section. Fig. 2 is a view of another form of the device in vertical section. Fig. 3 is a view in horizontal section on the line 3—3 of Fig. 1. Fig. 4 is a view of still another form of the device in vertical section. Fig. 5 shows a wiring diagram with a circuit closing device shown in section.

Referring first to the construction shown in Figs. 1 and 3. The numeral 10 designates a grease receptacle which is provided with a detachable cover 12 held in place by screw devices 14. The cover 12 at its center is provided with an upward tubular extension 16, the upper end of which has a thickened portion 18 which slidably receives a screw threaded rod 20 having a hand wheel 22 secured at its upper end. Secured to the lower end of the rod 20 is a stem 24 which extends downwardly and whose lower end carries a disk 26 which rests upon a stem 28 carried by the upper surface of a plunger 30 around the periphery of which is a packing 32 expanding against the inner surface of the receptacle 10. The lower end of a sleeve 34 fits over the stem 28 and is secured thereto by a pin 36 while the upper end of the sleeve has a shouldered portion 38 which rotatably engages the stem 24. The disk 26 is rotatably mounted within the sleeve 34. A ball-bearing 40 is interposed between the disk 26 and the shouldered member 38. The threads of the rod 20 engage internal threads of a sleeve 42 having a cupped upper end 44. A coiled spring 46 surrounds the rod 20 between the sleeve 42 and the cover 12, the lower end of this spring being secured in any suitable manner in the cupped portion 44 of the sleeve 42, and the upper end of the spring being secured in any suitable manner to the thickened portion 18 of the cover. When the screw devices 14 are loosened, the cover 12 carrying the plunger 30 may be removed from the receptacle 10, which is then nearly filled with grease. Before replacing the plunger, the hand wheel 22 is turned to feed the plunger up to the sleeve 42, the rod 20 sliding loosely up thru the member 18. When the plunger is replaced in the container, it will be forced resiliently against the grease by the spring 46 and as the grease is used the hand wheel 22 is from time to time turned to move the plunger downwardly which action occurs on account of the threaded engagement of the rod 20 with the sleeve 42. The grease is thereby constantly subjected to the resilient downward thrust of the plunger, due to the expansion tendency of the spring 46. Mounted in the lower end of the receptacle 10 is an iron casting 48 whose outer surface 50 engages the receptacle and has an outturned flange 52 at its lower end engaging an outturned flange 54 on the lower end of the receptacle. Screws 56 pass thru these flanges and thru the margin of a bottom plate 58 of brass. The casting 48 contains an annular chamber in which a wire coil 60 is placed, this coil being included in an electric circuit formed by wire 62 attached to any convenient circuit closing device. A conventional form of such device is shown in Fig. 5 in which the wires are attached to binding posts 64 and 66 insulatively mounted on a casing 68 containing a plunger 70 normally held by a spring 72, out of contact with the binding posts. When the plunger is depressed the posts 64 and 66 are bridged and the circuit is completed for energizing the coil 60. This coil is held in its chamber by a screw ring 74, while an armature plate 76 of iron is slidably mounted within the portion 50 of the casting 48. This casting has a central depression, the lower wall of which has an open center formed by an upward extension which is externally screw threaded and engaged by screw threads on the lower portion of a tubular member 80. A coiled spring 82 interposed between the member 80 and the armature plate 76 keeps the latter retracted when the coil 60 is not energized. The opening in the upper end of the tubular member 80 is provided with a downwardly opening check valve 84 which permits entrance of grease into the upper portion of the tubular member 80 from which a tube 86 leads out thru the wall of the container. The tube 86 at its outer end has a union 88 containing an outwardly opening check valve 90. The union is connected to a pipe 92 which delivers the grease to the place where it is to be utilized. Secured to the armature plate 76 is a piston 94 which operates in the tubular member 80 which serves as a cylinder. When the circuit closing device is actuated to energize the coil 60, the armature plate 76 is moved upwardly and carries the piston 94 with it, the upper end of the latter moving from the dotted line position indicated at 96 toward the upper end of the member 80 and forcing the grease in said member out thru the tube 86 and the pipe 92. When the circuit closing device is released, the armature plate 76 carries the piston downwardly thereby producing a vacuum in the upper portion of the cylinder 80 which causes grease to be sucked in past the check valve 84. In the form of invention shown in Fig. 2 the casting 48 and the parts associated directly therewith are utilized without the container and the mechanism in the upper portion thereof which is shown in Fig. 1 whereby the expense of construction is much reduced. The same reference characters are used in Fig. 2 so far as they are applicable. In this form of the invention, the upper end of the tubular member 80 is externally screw threaded to receive the threads of a coupling member 98, the interior of which is connected by a pipe 100 with a suitable grease receptacle. This form of invention is intended particularly for use in individual garages while that shown in Fig. 1 is intended for use at greasing stations. The form of invention shown in Fig. 4 is intended to be mounted in any convenient place directly upon a motor vehicle. This form includes a hollow iron casting 102 provided with a brass screw cap 104. The lower wall 106 of the casting contains a screw threaded depression in which is screwed the lower end of a tubular brass member 108, whose upper end has an outwardly extending annular flange 110, whereby a chamber is formed which in the form here shown contains four coils 112, 114, 116 and 118. These coils as shown at the right hand side have a common lead 120 and at the left hand side have separate leads 122, 123, 124 and 125 for a purpose which will be referred to later. The tubular member 108 slidably receives a solenoid core 126 attached to a plate 128 slidable in the upper portion of the casting 102. The central portion of the wall 106 is formed with a hollow downward extension 130 in which works a rod like piston 132 extending downwardly from the lower end of the solenoid core 126. The bore in the extension 130 is enlarged at its upper portion to provide a shoulder 134 between which, and the lower end of the core 126, a coiled spring 136 is interposed to hold the core upwardly when the coils are not energized. The extension 130 is provided with a hollow lateral extension 138 which is internally threaded to receive a hollow externally threaded projection 140, extending out from a grease container 142 provided with a screw cap 144, which permits it to be refilled. The lower end of the extension 130 is externally threaded to receive a coupling member 146, containing an outwardly opening check valve 148. Attached to the lower end of the coupling 146 is a pipe 150 which delivers the grease to the place where it is to be utilized. When the spring 136 moves the core 126 upwardly the lower end of the piston 132 slides past the opening in the extension 138 and the vacuum which is produced in the lower portion of the extension causes grease from the container 142 to be drawn in. When the coils are energized the piston 132 descends and forces grease out thru the pipe 150. The four coils included in the hollow iron casing 102 are spirally wound in the same direction with a common lead 120 on the right hand side as shown, and individual leads 122, 123, 124, and 125 on the left hand sides of the coils 112, 114, 116 and 118, so that several combinations can be obtained in order to fit the electrical conditions of the place where the device is to be utilized. For instance, when the coils are connected serially with the proper amount of resistance to suit the standard conditions of voltage and amperage, the maximum voltage with the minimum amperage is obtained, while when the coils are connected in groups of two or more the opposite effect is obtained, viz, the maximum amperage with the minimum voltage. The first case is that of the usual lighting circuit and the second is that of the storage battery. Other combinations with outside rheostat control enable the pressure to be constrained under remote control for automatic lubrication of grease cups or oil cups located at any distance from the source of control as in the case of line shafting, power stations or other devices and apparatus in which automatic lubrication is of great advantage.

I claim:

1. A grease gun comprising a source of supply of grease, a tubular member connected with said source, a delivery pipe connected to said tubular member, a piston working axially in said tubular member, a magnetically attracted device to which the outer end of said piston is secured, an iron member disposed concentrically with relation to said tubular member, a wire coil surrounding said iron member, a circuit-closing device for said coil located at a distance remote therefrom whereby said piston may be moved inwardly for ejecting grease through said delivery pipe, and a spring for returning said piston when said circuit-closing device is open.

2. A grease gun comprising a tubular member, a supply pipe and a delivery pipe connected with the interior of said tubular member at one end thereof, a piston working through the other end of said tubular member, an electrically operated device for causing movement of said piston in one direction, a circuit for said electrical device, means for opening and closing said circuit, and a spring for causing movement of said piston in the other direction.

In testimony whereof I hereunto affix my signature.

EDGAR A. DE FOREST.